United States Patent [19]

Fukui et al.

[11] Patent Number: 4,562,230

[45] Date of Patent: Dec. 31, 1985

[54] MODIFIED POLYOLEFIN COMPOSITION AND PROCESS FOR PRODUCING THE SAME

[75] Inventors: Osamu Fukui, Toyonaka; Yoshihiro Inuizawa, Sakai; Saburo Hinenoya, Izumisano; Yasufumi Takasaki, Sakai, all of Japan

[73] Assignee: UBE Industries, Ltd., Yamaguchi, Japan

[21] Appl. No.: 550,764

[22] Filed: Nov. 10, 1983

Related U.S. Application Data

[63] Continuation-in-part of Ser. No. 466,861, Feb. 16, 1983, abandoned.

[30] Foreign Application Priority Data

Mar. 1, 1982 [JP] Japan ................................ 57-30631

[51] Int. Cl.$^4$ ...................... C08L 51/06; C08L 23/16; C08L 23/26
[52] U.S. Cl. ........................................ 525/74; 525/78; 525/75
[58] Field of Search ............................ 525/78, 74, 75

[56] References Cited

U.S. PATENT DOCUMENTS

| | | | |
|---|---|---|---|
| 3,868,433 | 2/1975 | Bartz et al. | 525/74 |
| 3,987,122 | 10/1976 | Bartz et al. | 525/193 |
| 4,198,327 | 4/1980 | Matsumoto et al. | 525/74 |
| 4,230,830 | 10/1980 | Tanny et al. | 525/193 |

*Primary Examiner*—Carman J. Seccuro
*Attorney, Agent, or Firm*—Burgess, Ryan & Wayne

[57] ABSTRACT

A modified polyolefin composition useful for producing a shaped article having an excellent bonding property and an enhanced impact resistance comprises a modified olefin polymer material prepared by melting a mixture of an olefin polymer material comprising at least one crystalline ethylene-propylene random copolymer containing from 0.5 to 5% by weight of copolymerized ethylene and having a melt flow index of from 0.2 to 5 with a modifying agent consisting of at least one unsaturated dicarboxylic anhydride and a radical reaction initiator at a temperature of from 170° C. to 270° C. at which the mixture is melted; and a polyolefin rubber having a Mooney viscosity $ML_{1+4}$ (100° C.) of 10 to 100 and mixed in an amount of from 5% to 40% based on the sum of the weight of the modified olefin polymer material and the polyolefin rubber with the modified olefin polymer material at a temperature at which the mixture is melted.

8 Claims, No Drawings

MODIFIED POLYOLEFIN COMPOSITION AND PROCESS FOR PRODUCING THE SAME

RELATED APPLICATION

This application is a continuation-in-part of our application Ser. No. 466,861 filed on Feb. 16, 1983, and now abandoned.

BACKGROUND OF THE INVENTION

1. Field of the Invention

The present invention relates to a modified polyolefin composition and to a process for producing the same. Particularly, the present invention relates to a modified polyolefin composition having an excellent bonding property and being useful for producing shaped articles having an excellent impact resistance, especially at a low temperature, and to a process for producing the same.

2. Prior Art

It is known that crystalline polypropylene is useful for producing various shaped articles, for example, injection-molded articles, films, and injection-blow molded articles, for example, bottles, which must exhibit excellent physical properties, for example, rigidity and resistance to thermal deformation.

It is also known, however, that since the molecules of the crystalline polypropylene have no polar groups, the crytalline polypropylene exhibits an extremely poor bonding activity to synthetic resin articles, metal articles, and wood articles.

There have been attempted various methods for the purpose of enhancing the bonding property of the crystalline polypropylene. In the attempts, a surface of a crystalline polypropylene article to be bonded to another article was treated with a flame, a corona discharge, or a solvent. These attempts were not always successful in enhancing the bonding property of the crystalline polypropylene.

In another attempt, a crystalline polypropylene was subjected to an addition reaction with an unsaturated dicarboxylic acid, for example, maleic acid, or its anhydride, in the presence of a radical reaction initiator at an elevated temperature so as to modify the crystalline polypropylene to a modified polypropylene having functional radicals which are effective for enhancing the bonding property of the crystalline polypropylene. This attempt was, however, not successful because the bonding property of the resultant modified polypropylene was unsatisfactory. Also, the resultant modified polypropylene exhibited a poor impact resistance at a low temperature.

In still another attempt, Japanese Unexamined Patent Publication No. 52-8035 discloses a process for producing a polyolefin composition usable as a coating material. In this process, a mixture of a crystalline polyolefin, an unsaturated aliphatic carboxylic acid or its anhydride, and a rubber compound was heated at a temperature higher than the melting point of the crystalline polyolefin. However, the bonding property and impact resistance of the modified polyolefin composition at a low temperature were still unsatisfactory.

SUMMARY OF THE INVENTION

An object of the present invention is to provide a modified polyolefin composition useful for producing various shaped articles having a high bonding property and an excellent high impact property at a low temperature and a process for producing the same.

The modified polyolefin composition of the present invention comprises:

a modified olefin polymer material which is a reaction product of 100 parts by weight of at least one crystalline ethylene-propylene random copolymer containing from 0.5% to 5% by weight of copolymerized ethylene having a melt flow index of from 0.2 to 5 with from 0.02 to 0.3 part by weight of a modifying agent consisting of at least one unsaturated dicarboxylic anhydride, in the presence of from 0.01 to 0.2 parts by weight of a radical reaction initiator at a temperature of from 170° C. to 270° C. at which the reaction mixture is melted; and a polyolefin rubber having a Mooney viscosity $ML_{1+4}$ (100° C.) of from 10 to 100 at a temperature of 100° C., in an amount of from 5% to 40% based on the sum of the weights of the modified olefin polymer material and the polyolefin rubber, which polyolefin rubber material has been mixed with the modified olefin polymer material at a temperature at which the resultant mixture is melted, the composition having a melt flow index of from 1 to 20 g/10 min determined in accordance with ASTM D-1238 at a temperature of 230° C.

The process of the present invention for producing a modified polyolefin composition having a melt flow index of from 1 to 20 g/10 min determined in accordance with ASTM Y-D-1239 at a temperature of 230° C. comprises the step of:

melting a reaction mixture of an olefin polymer material comprising 100 parts by weight of at least one crystalline ethylene-propylene random copolymer containing from 0.5% to 5% by weight of copolymerized ethylene and having a melt flow index of from 0.2 to 5 with from 0.02 to 0.3 part by weight of a modifying agent consisting of at least one unsaturated dicarboxylic anhydride in the presence of from 0.01 to 0.2 part by weight of a radical reaction initiator at temperature of from 170° C. to 270° C. at which the reaction mixture is melted so as to modify the olefin polymer material; and mixing the resultant modified polymer material with a polyolefin rubber having a Mooney viscosity $ML_{1+4}$ (100° C.) of from 10 to 100, in an amount of from 5% to 40% based on the sum of the weights of the modified olefin polymer material and the polyolefin rubber at a temperature at which the resultant mixture is melted.

DETAILED DESCRIPTION OF THE INVENTION

In the modified polyolefin composition, the modified olefin polymer material is a modification reactin product of an olefin polymer material with a modifying agent in the pressure of radical reaction initiator.

The olefin polymer material comprises at least one crystalline ethylene-propylene random copolymer. The crystalline ethylene-propylene random copolymer contains from 0.5% to 5% by weight of copolymerized ethylene and has a melt flow index of from 0.2 to 5. For the purpose of obtaining a modified polyolefin composition article having a high bonding property, it is necessary that the melt flow index of the crystalline ethylene-propylene random copolymer be in the range of from 0.2 to 5.

If the content of the copolymerized ethylene in the crystalline ethylene-propylene random copolymer is less than 0.5% by weight, when the resultant modified polyolefin composition is used as a hot melt-type bonding material, in order to obtain a satisfactory bonding result, it is necessary to use an increased pre-heating temperature and bonding pressure.

If the content of the polymerized ethylene is more than 5%, the resultant modified polyolefin composition exhibits a decreased bonding property.

If the crystalline ethylene-propylene random copolymer has a melt flow index of more than 5 g/10 min or less than 0.2 g/10 min, the resultant modified polyolefin composition exhibits a decreased bonding property.

The olefin polymer material may contain a small amount of an additive, for example, an antioxidant, a flame retardant, or a filler, unless the additive is decomposed with the radical reaction initiator during the modification reaction at an elevated temperature, thereby causing the resultant composition to be discolored or to generate a bad odor.

The olefin polymer material may be in the form of powder or pellets.

The modifying agent usable for the present invention consists of at least one unsaturated dicarboxylic anhydride. The unsaturated dicarboxylic anhydride may be selected from anhydrides of maleic acid, fumaric acid, mesaconic acid, citraconic acid, 5-norbornene-2,3-dicarboxylic acid, and 1,2,3,6-tetrahydrophthalic acid. A preferable modifying agent consists of maleic anhydride.

The modifying agent is used in an amount of from 0.02 to 0.3 part by weight, per 100 parts by weight of the olefin polymer material.

If the amount of the modifying agent is less than 0.02 parts by weight per 100 parts of the olefin polymer material, the resultant polyolefin composition exhibits an unsatisfactory bonding property. If the amount of the modifying agent is more than 0.3 part, an increase in the amount of the modifying agent not only does not result in an increase in the bonding property of the resultant modified polyolefin composition but also causes the resultant modified polyolefin composition to have a bad odor and to pollute the environment.

The radical reaction initiator usable for the present invention consists essentially of at least one member selected from the group consisting of azobis compounds and organic peroxide compounds which exhibit a one-minute half-life temperature at approximately 160° C. to 270° C.

The azobis compound may be azobisisobutylonitrile. The organic peroxide compound may be selected from the group consisting of tert-butyl peroxyisopropyl carbonate, di-tert-butyl-di-peroxyphthalate, tert-butyl-peroxyacetate, 2,5-dimethyl-2,5-di(benzoylperoxy)hexane, tert-butyl-peroxylaurate, tert-butylperoxybenzoate, methylethylketone peroxide, dicumyl peroxide, cyclohexanone peroxide, tert-butylcumyl peroxide, diisopropylbenzenehydroperoxide, and cumenehydroperoxide. The radical reaction initiator may consist of either a single compound or a mixture of two or more compounds.

The radical reaction initiator is used in an amount of from 0.01 to 0.2 part by weight, per 100 parts by weight of the olefin polymer material.

If the amount of the radical reaction initiator is less than 0.01 part by weight per 100 parts by weight of the olefin polymer material, the resultant modified polyolefin composition exhibits an unsatisfactory bonding property. An excess amount of the radical reaction initiator exceeding 0.2 part by weight is not effective for increasing the bonding property of the resultant modified polyolefin composition. A large excess amount of the radical reaction initiator results in a decrease in the bonding property of the resultant polyolefin composition.

The radical reaction initiator (RI) and the modifying agent (MA) are preferably used in a weight ratio (RI/MA) of from 0.1:1 to 5:1, more preferably from 0.2:1 to 2:1.

In the preparation of the modified olefin polymer material, the olefin polymer material is dry-blended with the modifying agent and the radical reaction initiator, and the resultant reaction mixture is subjected to a melt modification reaction at a temperature of from 170° C. to 270° C. at which the reaction mixture is melted.

In the preparation of the modified olefin polymer material, it is important that the melt modification reaction of the reaction mixture be carried out in the substantial absence of the polyolefin rubber to be mixed with the resultant modified olefin polymer material.

If the modification reaction is carried out in the presence of the polyolefin rubber, the resultant modified polyolefin composition exhibits not only a poor bonding property but also an unsatisfactory high impact property at a low temperature. This fact is illustrated by Comparative Example 1, described hereinafter.

The melt modification reaction can be carried out by using a conventional melt mixer, for example, a Banbury mixer, kneader, mixing roll, or extruder or a combination of two or more of the above-mentioned mixers.

The melt modification reaction is carried out at a temperature at which the reaction mixture is melted, that is, at a temperature which is higher than the melting point of the olefin polymer material, and is in the range of from 170° C. to 270° C. In this case, it is necessary that the reaction temperature not result in the decomposition of the olefin polymer material and the modified olefin polymer material. Also, the reaction temperature should be determined in consideration of the decomposition point of the radical reaction initiator.

If the reaction temperature is less than 170° C., it becomes difficult to conduct the reaction evenly. If the reaction temperature is more than 270° C., it causes undesirable deterioration of the crystalline ethylene-propylene random copolymer.

The resultant modified olefin polymer material is mixed with a polyolefin rubber (elastomer) at a temperature at which the resultant mixture is melted.

The polyolefin rubber usable for the present invention comprises at least 50% by weight of at least one member selected from the group consisting of ethylene-propylene copolymer rubbers, ethylene-propylene-non-conjugated diene terpolymer rubbers, ethylene-propylene-butene-1 terpolymer rubbers, poly-isobutylene rubbers, and 1,2-polybutadiene rubbers. It is preferable that the polyolefin rubber consist of an ethylene-propylene copolymer rubber or an ethylene-propylene-non-conjugated diene terpolymer rubber.

The polyolefin rubber may contain 50% by weight or less of at least one member selected from the group consisting of styrene-butadiene copolymer rubbers, butadiene-styrene-acrylonitrile terpolymer rubbers, cis-1,4-polybutadiene rubbers, chloroprene polymer rubbers, natural rubber, polyurethane rubbers, and ethylene-vinyl acetate copolymer rubbers.

The polyolefin rubber may consist of either a single rubber or a mixture of two or more different rubbers.

Also, the polyolefin rubber may contain a small amount of an additive, for example, an anti-aging agent, such as an antioxidant, or an anti-blocking agent, such as a fatty acid metal salt, unless the additive causes the resultant modified polyolefin composition to be discolored or to generate a bad odor.

The polyolefin rubber usable for the present invention exhibits a Mooney viscosity, $ML_{1+4}$ (100° C.), of 10 to 100 at a temperature of 100° C.

A polyolefin rubber having a Mooney viscosity of less than 10 at 100° C. results in a modified polyolefin composition having a decreased impact resistance at a low temperature. Also, it is difficult to evenly disperse a polyolefin rubber having a Mooney viscosity of more than 100 at 100° C. in the olefin polymer material.

The polyolefin rubber is mixed in an amount of from 5% to 40% by weight, more preferably from 5% to 30% by weight, based on the total weight of the modified olefin polymer material and the polyolefin rubber. If the amount of the polyolefin rubber is less than 5% by weight, it becomes difficult to obtain a modified polyolefin composition which is satisfactory in respect to the high impact property. An excessively large amount of the polyolefin rubber results in a decreased cohesive force and, therefore, in a poor bonding property and unsatisfactory moldability (film-forming property or powder-forming property) and in the thermal resistance thereof.

The melt mixing procedure is carried out at a temperature at which the resultant mixture is melted. This melt mixing procedure can be carried out by using a conventional melt mixer, for example, a Banbury mixer, kneader, mixing roll, or extruder or a combination of two or more of the above-mentioned mixers.

The melt mixing temperature is determined in consideration of the decomposition points of the modified olefin polymer material and the polyolefin rubber and is usually in the range of from 170° C. to 270° C.

The modified polyolefin composition of the present invention exhibits a melt flow index of from 1 to 2 g/10 min determined in accordance with ASTM D-1238 at a temperature of 230° C.

A modifier polyolefin composition having a melt flow index of less than 1 g/10 min exhibits a poor bonding property to metals. Also, a melt flow index of more than 20 g/10 min causes the resultant modified polyolefin composition to exhibit a decreased bonding property.

The modified polyolefin composition of the present invention may be mixed with a conventional additive which is usually mixed with the conventional crystalline olefin polymer material. The additive may consist of an antioxidant, a weathering stabilizer, a lubricant, an anti-static agent, a nucleating agent, a filler, a pigment, a dye, a flame retardant, an anti-blocking agent, a slip agent, or a mixture of two or more of the above-mentioned agents.

When the modified polyolefin composition of the present invention is subjected to actual use, it may be blended with a non-modified crystalline olefin polymer material consisting of, for example, a crystalline propylene homopolymer, a crystalline ethylene-propylene random copolymer, a crystalline ethylene-propylene block copolymer, or a mixture of two or more of the above-mentioned polymers. In this case, it is preferable that the non-modified crystalline olefin polymer material be used in an amount of 900 parts by weight or less, more preferably 500 parts by weight or less, per 100 parts by weight of the modified polyolefin composition of the present invention.

In the case where the modified polyolefin composition is used for producing a shaped resinous article which needs to be provided with an excellent mechanical strength, a reinforcing material is blended with the modified polyolefin composition. The reinforcing material may consist of at least one member selected from inorganic reinforcing agents, for example, calcium carbonate, talc, clay, alumina, zinc oxide, magnesium oxide, diatomaceous earth, mica, calcium sulfite, calcium sulfate, calcium silicate, glass powder, glass fibers, asbesto, gypsum fibers, kaolin, fired kaolin, carbon fibers, and fibrous magnesium oxysulfate; and organic reinforcing materials, for example, aromatic polyamide fibers. The form and size of the reinforcing material are not limited to a specific form and size. However, when the reinforcing material is in the form of fine particles, it is preferable that the average size of the particles be 10 microns or less. The amount of the reinforcing material to be blended into the modified polyolefin composition is determined so that the resultant shaped article exhibits satisfactory mechanical properties and a satisfactory moldability and processability. Usually, it is preferable that the amount of the reinforcing material be 450 parts by weight or less, more preferably 10 to 300 parts by weight, per 100 parts by weight of the modified polyolefin composition.

The modified polyolefin composition of the present invention exhibits a brittleness temperature of −20° C. or less and, therefore, has a better resistance to mechanical impact at a low temperature than does the conventional polypropylene. Also, the modified polyolefin composition has a significantly better bonding property than does the conventional polypropylene and exhibits a satisfactory heat resistance moldability, and processability.

That is, the modified polyolefin composition of the present invention is converted to a shaped article which is capable of being firmly and easily bonded to another article made of, for example, a metallic material, plastic material, or another material and which exhibits an excellent resistance to mechanical impact.

In the preparation of the modified polyolefin composition of the present invention, the olefin polymer material can be modified with a small amount of the specific modifying agent to a satisfactory extent. That is, the amount of the modifying agent used is entirely consumed during the modification reaction. Therefore, after the modification procedure is completed, it is unnecessary to subject the resultant reaction product to an aftertreatment for removing the non-reacted modifying agent, for example, the complicated process disclosed in Japanese Unexamined Patent Publication No. 56-118411, in which process the modification reaction product is aftertreated with hot air for from 3 to 8 hours or with hot water for from 1 to 5 hours. Also, it is advantageous that the modified polyolefin composition of the present invention contain substantially no gel. Therefore, even after exposure to a high temperature treatment, the composition retains a satisfactory moldability and the resultant article exhibits a satisfactory appearance.

Since the olefin polymer material to be modified consists of only at least one crystalline ethylene-propylene random copolymer, the resultant modified polyolefin composition exhibits an enhanced bonding property in comparison with polypropylene or ethylene-propylene block copolymers, even if the preheating temperature is low and the bonding pressure is low. The bonding property of the modified polyolefin composition of the present invention is higher than that of conventional polyethylene bonding materials even at an elevated temperature, for example, approximately 120° C.

The specific examples presented below will serve to more fully illustrate how the present invention is practiced. However, it should be understood that these examples are only illustrative and in no way limit the scope of the present invention.

In the example, the melt flow index was determined in accordance with ASTM D 1238.

The Mooney viscosity $ML_{1+4}$ (100° C.) was determined in accordance with Japanese Industrial Standard (JIS) K 6300.

The resistance of the modified polyolefin composition to mechanical impact was determined according to the brittleness temperature thereof. The brittleness temperature was determined in the following manner in accordance with ASTM D 746.

A number of test specimens each having a length of 38 mm, a width of 6 mm, and a thickness of 2 mm were prepared by punching a modified polyolefin composition sheet. Ten specimens were subjected to an impacting test at a predetermined temperature. The number of specimens ruptured by the impacting test was counted to determine the percentage of ruptured specimens. The impacting test was repeated at various temperatures. The relationship between the impacting temperature and the percentage of ruptured specimens was determined. The brittleness temperature of the tested specimens was determined according to the impacting temperature at which the percentage of ruptured specimens was 50.

The lower the brittleness temperature, the higher the impact resistance, especially at a low temperature, of the specimens.

The bonding property of the modified polyolefin composition was determined according to the peeling strength measured as follows.

A sheet having a length of 200 mm, a width of 200 mm, and a thickness of 0.3 mm was prepared in the following manner. That is, pellets of a modified polyolefin composition were preheated at a temperature of 210° C. for three minutes and then were pressed with a pressing plate at a temperature of 210° C. under a pressure of 100 kg/cm² for one minute to form a sheet. The sheet was placed on a steel plate (SS-41), having a length of 200 mm, a width of 200 mm, and a thickness of 9 mm and having been subjected to a grit blasting treatment and heated at a temperature of 200° C., and was completely melted on the steel plate for two minutes. A sheet consisting of a crystalline polypropylene and having a thickness of 2 mm was placed on the melted modified polyolefin composition sheet and was pressed at the above-mentioned temperature under a pressure of 0.1 kg/cm² for three minutes. The resultant laminate was cooled under the above-mentioned pressure to the ambient temperature.

The laminate was placed on a tensile tester on which the crystalline polypropylene sheet was peeled from the steel plate at a rate of pulling of 10 mm/min at angles of 90 degrees.

EXAMPLES 1 THROUGH 4

In each of Examples 1 through 4, 100 parts by weight of pellets consisting essentially of a crystalline ethylene-propylene random copolymer containing 3% by weight of copolymerized ethylene and having a melt flow index (MI) of 1.0 were mixed with maleic anhydride and tert-butylperoxybenzoate in the amounts indicated in Table 1 by using a Henschel mixer. The crystalline ethylene-propylene random copolymer pellets contained 1,000 ppm of 2,6-di-tert-butyl-p-cresol (BHT).

The resultant reaction mixture was fed into a monoaxial (single screw) extruder and was melted in the front portion of the cylinder of the extruder at a temperature of 190° C. so as to modify the random copolymer. The modification reaction product was extruded and converted to pellets. The pellets of the modification reaction product in an amount of 80 parts by weight were blended with 20 parts by weight of pellets consisting of an ethylene-propylene copolymer rubber containing approximately 80% by weight of copolymerized ethylene by using a cone blender. The copolymer rubber contained 1,000 ppm of BHT and 8,000 ppm of calcium stearate.

The resultant mixture was fed into a monoaxial extruder and was melt-blended in the front portion of the cylinder of the extruder at a temperature of 190° C. The melt-blended mixture was extruded and converted into pellets.

The pellets were subjected to the above-mentioned tests. The results of the tests are indicated in the Table.

COMPARATIVE EXAMPLE 1

The same crystalline ethylene-propylene random copolymer and the same ethylene-propylene copolymer rubber as those described in Example 1 were blended with maleic anhydride and tert-butyl peroxybenzoate in the same amounts as those described in Example 2. The resultant mixture was melted and converted to pellets in the same manner as that described in Example 1. The results of the tests are indicated in Table 1.

COMPARATIVE EXAMPLE 2

The same procedures as those described in Example 2 were carried out except that no tert-butylperoxybenzoate was used.

The results of the tests are indicated in Table 1.

EXAMPLE 5

The same procedures as those described in Example 2 were carried out except that the resultant modified polyolefin composition pellets were dried at a temperature of 100° C. in a vacuum for three days.

The results of the tests are shown in Table 1.

EXAMPLE 6

The same procedures as those described in Example 5 were carried out except that 70 parts by weight of the pellets of the modification reaction product were mixed with 30 parts by weight of the ethylene-propylene copolymer rubber pellets.

The results of the tests are indicated in Table 1.

EXAMPLE 7

The same procedures as those described in Example 5 were carried out except that the tert-butyl peroxybenzoate was used in an amount of 0.03 part by weight. The results of the tests are indicated in Table 1.

EXAMPLES 8 THROUGH 9

In Examples 8 through 10, the same procedures as those described, respectively, in Examples 5, 6, and 7 were carried out except that no vacuum-drying procedure was applied to the modified polyolefin composition pellets.

The results of the tests are shown in Table 1.

Table 1 clearly shows that the modified polyolefin composition of the present invention exhibits an excellent bonding property and a superior resistance to mechanical impact at a low temperature.

COMPARATIVE EXAMPLE 3

The same procedures as those described in Example 11 were carried out except that the modified olefin polymer material pellets were prepared from 100 parts by weight of a crystalline ethylene-propylene random copolymer having a melt flow index of 0.4 g/10 min and containing 3% by weight of copolymerized ethylene

TABLE 1

| Example No. | | Composition | | | | Properties of Modified Polyolefin Composition | | |
|---|---|---|---|---|---|---|---|---|
| | Item | Maleic anhydride (PHR)* | Organic peroxide (PHR)* | Weight ratio of crystalline ethylene-propylene random copolymer to ethylene-propylene copolymer rubber | Vacuum-drying procedure | Melt flow index (g/10 min) | Peeling strength (kg/cm) | Brittleness temp. (°C.) |
| Example | 1 | 0.3 | 0.05 | 80:20 | none | 6.9 | 16.5 | −32 |
| | 2 | 0.1 | 0.05 | 80:20 | none | 5.0 | 20.7 | −34 |
| | 3 | 0.05 | 0.05 | 80:20 | none | 4.0 | 21.8 | −33 |
| | 4 | 0.02 | 0.05 | 80:20 | none | 3.8 | 15.8 | −31 |
| Comparative | 1 | 0.1 | 0.05 | 80:20 | none | 2.6 | 9.1 | −15 |
| Example | 2 | 0.1 | 0 | 80:20 | none | 1.2 | 1.0 | −34 |
| Example | 5 | 0.1 | 0.05 | 80:20 | Applied | 4.9 | 20.5 | −34 |
| | 6 | 0.1 | 0.05 | 70:30 | Applied | 4.0 | 20.0 | −52 |
| | 7 | 0.1 | 0.03 | 80:20 | Applied | 3.7 | 14.0 | −32 |
| | 8 | 0.1 | 0.05 | 80:20 | none | 5.0 | 20.7 | −34 |
| | 9 | 0.1 | 0.05 | 70:30 | none | 4.0 | 19.8 | −52 |
| | 10 | 0.1 | 0.03 | 80:20 | none | 3.7 | 14.2 | −32 |

EXAMPLE 11

A reaction mixture of 100 parts by weight of pellets consisting of a crystalline ethylene-propylene random copolymer containing 3% by weight of copolymerized ethylene and having a melt flow index of 0.8 and 0.15 part by weight of maleic anhydride and 0.05 part by weight of tert-butylperoxybenzoate was prepared in a Henschel mixer.

The resultant reaction mixture was fed into a monoaxial extruder and was melted in the front portion of the cylinder of the extruder at a temperature of 180° C. so as to modify the random polymer.

The modification reaction product in an amount of 65 parts by weight was mixed with 35 parts by weight of the same tye of ethylene-propylene copolymer rubber as that described in Example 1. The mixture was subjected to the same melt-blending procedure as that described in Example 1.

| Melt flow index | 2.0 g/10 min |
|---|---|
| Peeling strength | 20 kg/min |
| Brittleness temperature | −56° C. |

EXAMPLE 12

The same procedures as those described in Example 11 were carried out except that the crystalline ethylene-propylene random copolymer contained 3% by weight of copolymerized ethylene and 1,000 ppm of BHT and had a melt flow index of 0.4 g/10 min.

The resultant modified polyolefin composition pellets exhibited the following properties:

| Melt flow index | 1.2 g/10 min |
|---|---|
| Peeling strength | 19.5 kg/cm |
| Brittleness temperature | −58° C. | and 1,000 ppm of BHT, 1.5 parts by weight of maleic anhydride and 0.5 part by weight of tert-butylperoxybenzoate; and that 7 parts by weight of the resultant modified olefin polymer and 83 parts by weight of a non-modified crystalline ethylene-propylene random polymer and 10 parts by weight of the same ethylene-propylene copolymer rubber as that described in Example 1 were mixed together to provide a comparative modified polyolefin polymer which had the following properties:

| Melt flow index | 0.6 g/10 min |
|---|---|
| Peeling strength | 8.0 kg/cm |
| Brittleness temperature | −20° C. |

We claim:

1. A modified polyolefin composition, consisting essentially of (A) a modified olefin polymer material which is a reaction product of 100 parts by weight of at least one crystalline ethylene-propylene random copolymer containing from 0.5% to 5% by weight of copolymerized ethylene and having a melt flow index of from 0.2 to 5, with from 0.02 to 0.3 parts by weight of a modifying agent consisting of at least one unsaturated dicarboxylic anhydride in the presence of from 0.01 to 0.2 parts by weight of a radical reaction initiator at a temperature of from 170° C. to 270° C. at which the reaction mixture is molten; and (B) an ethylene-propylene copolymer rubber in an amount of from 35% to 40% based on the sum of the weight of said modified olefin polymer material and said ethylene-propylene copolymer rubber, which copolymer rubber material has been mixed with said modified olefin polymer material at a temperature at which the resultant mixture is molten, said composition having a melt flow index of from 1 to 20 g/10 min determined in accordance with ASTM D 1238 at a temperature of 230° C., and a brittleness temperature not higher than −20° C.

2. The composition as claimed in claim 1, wherein said radical reaction initiator (RI) and said modifying agent (MA) are used in a weight ratio (RI/MA) of from 0.1:1 to 5:1.

3. The composition as claimed in claim 1, wherein said unsaturated dicarboxylic anhydride is selected from the group consisting of anhydrides of maleic acid, fumaric acid, mesaconic acid, citraconic acid, 5-norbornene-2,3-dicarboxylic acid, and 1,2,3,6-tetrahydrophthalic acid.

4. The composition as claimed in claim 1, wherein said radical reaction initiator consists essentially of at least one member selected from the group consisting of azobis compounds and organic peroxide compounds which exhibit a one-minute half-life temperature of approximately 160° C. to 270° C.

5. The composition as claimed in claim 1, wherein said copolymer rubber is selected from the group consisting of ethylene-propylene copolymer rubbers, ethylene-propylene-non-conjugated diene terpolymer rubbers, and ethylene-propylene-butene-1 terpolymer rubbers.

6. A process for producing a modified polyolefin composition having a melt flow index of from 1 to 20 g/10 min determined in accordance with ASTM D 1238 at a temperature of 230° C., comprising the steps of:

melting a reaction mixture of an olefin polymer material comprising 100 parts by weight of at least one crystalline ethylene-propylene random copolymer containing from 0.5% to 5% by weight of copolymerized ethylene and having a melt flow index of from 0.2 to 5 with from 0.02 to 0.3 parts by weight of a modifying agent consisting of at least one unsaturated dicarboxylic anhydride in the presence of from 0.01 to 0.2 parts by weight of a radical reaction initiator at temperature of from 170° C. to 270° C. at which the reaction mixture is melted so as to modify said olefin polymer material; and mixing the resultant modified olefin polymer material with ethylene-propylene copolymer rubber having a Mooney viscosity $ML_{1+4}$ (100° C.) of from 10 to 100 in an amount of from 35% to 40% based on the sum of the weights of said modified olefin polymer material and said ethylene-propylene copolymer rubber at a temperature at which the resultant mixture is melted.

7. The process as claimed in claim 6, wherein said mixing operation is carried out at a temperature of from 160° C. to 270° C.

8. A shaped composite article wherein shaped articles made of a metallic material are bonded to each other with the modified polyolefin composition of claim 1.

* * * * *